United States Patent
Kim et al.

(10) Patent No.: US 10,219,149 B2
(45) Date of Patent: Feb. 26, 2019

(54) METHOD FOR MANAGING SUBSCRIBER INFORMATION TO RESPOND TO NETWORK FAILURE, AND SUBSCRIBER INFORMATION SERVER

(71) Applicant: LG ELECTRONICS INC., Seoul (KR)

(72) Inventors: Hyunsook Kim, Seoul (KR); Jinsook Ryu, Seoul (KR); Laeyoung Kim, Seoul (KR); Jaehyun Kim, Seoul (KR); Taehun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 195 days.

(21) Appl. No.: 15/128,853

(22) PCT Filed: Apr. 23, 2015

(86) PCT No.: PCT/KR2015/004075
§ 371 (c)(1),
(2) Date: Sep. 23, 2016

(87) PCT Pub. No.: WO2015/163713
PCT Pub. Date: Oct. 29, 2015

(65) Prior Publication Data
US 2018/0199188 A1    Jul. 12, 2018

Related U.S. Application Data

(60) Provisional application No. 61/982,886, filed on Apr. 23, 2014.

(51) Int. Cl.
*H04W 8/30* (2009.01)
*H04W 60/04* (2009.01)
(Continued)

(52) U.S. Cl.
CPC ........... *H04W 8/30* (2013.01); *H04L 41/0654* (2013.01); *H04L 41/0668* (2013.01);
(Continued)

(58) Field of Classification Search
CPC ........... H04W 8/30; H04W 8/20; H04W 8/28; H04W 36/12; H04W 76/18; H04W 60/04;
(Continued)

(56) References Cited

U.S. PATENT DOCUMENTS

| 2012/0189016 | A1* | 7/2012 | Bakker | H04W 76/021 370/401 |
|---|---|---|---|---|
| 2013/0242754 | A1 | 9/2013 | Shaikh et al. | |
| 2013/0250838 | A1 | 9/2013 | Liang et al. | |
| 2013/0332562 | A1 | 12/2013 | Naidu et al. | |

(Continued)

FOREIGN PATENT DOCUMENTS

JP     2012120137 A    6/2012

OTHER PUBLICATIONS

NTT DoCoMo/NEC: "PCRF Failure and Restoration—A way forward—", 3GPP TSG CT4 Meeting #51-BIS, C4-110125, Jan. 24-28, 2011.

(Continued)

*Primary Examiner* — Ian N Moore
*Assistant Examiner* — Justin T Van Roie
(74) *Attorney, Agent, or Firm* — Dentons US LLP

(57) ABSTRACT

One embodiment of the present specification provides a method for managing subscriber information to respond to a network failure in a home subscriber server (HSS). The method can comprise the steps of: receiving a packet data network (PDN) failure indication; updating subscriber information related to a PDN on the basis of the PDN failure indication; and transmitting a message that indicates the update of the subscriber information.

9 Claims, 12 Drawing Sheets

(51) Int. Cl.
- *H04W 76/18* (2018.01)
- *H04L 12/24* (2006.01)
- *H04W 8/04* (2009.01)
- *H04L 29/06* (2006.01)
- *H04W 8/20* (2009.01)
- *H04W 8/28* (2009.01)
- *H04W 36/12* (2009.01)

(52) U.S. Cl.
CPC ...... *H04L 65/1016* (2013.01); *H04L 65/1073* (2013.01); *H04W 8/04* (2013.01); *H04W 8/20* (2013.01); *H04W 8/28* (2013.01); *H04W 36/12* (2013.01); *H04W 60/04* (2013.01); *H04W 76/18* (2018.02)

(58) Field of Classification Search
CPC .. H04W 8/04; H04L 41/0654; H04L 65/1016; H04L 41/0668; H04L 65/1073
See application file for complete search history.

(56) References Cited

U.S. PATENT DOCUMENTS

| | | | |
|---|---|---|---|
| 2014/0155048 A1 | 6/2014 | Zawaideh et al. | |
| 2015/0156093 A1* | 6/2015 | Li | G06F 11/079 714/37 |
| 2015/0195864 A1* | 7/2015 | Bartolome Rodrigo | H04W 76/38 370/221 |
| 2015/0282145 A1 | 10/2015 | Kim et al. | |
| 2016/0316496 A1* | 10/2016 | Dannebro | H04W 76/12 |

OTHER PUBLICATIONS

Motorola Solutions, "Report on the status of LS S2-140563 to RAN", S2-140702, 3GPP TSG-SA WG2 #101bis, San Jose Del Cabo, Mexico, Feb. 21, 2014.

Alcatel-Lucent et al., "Reporting changes of UE presence in Presence Reporting Area", C4-140767, 3GPP TSG-CT WG4 #64bis, Dubrovnik, Croatia, Apr. 4, 2014.

* cited by examiner

METHOD FOR MANAGING SUBSCRIBER INFORMATION TO RESPOND TO NETWORK FAILURE, AND SUBSCRIBER INFORMATION SERVER

CROSS-REFERENCE TO RELATED APPLICATIONS

This is application is a National Stage Entry of International Application No. PCT/KR2015/004075 filed Apr. 23, 2015, which claims priority to U.S. Provisional Application No. 61/982,886 filed Apr. 23, 2014, both of which are incorporated by reference for all purposes as if fully set forth herein.

BACKGROUND OF THE INVENTION

Field of the Invention

The present invention relates to a technique for responding to a network failure.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network and FIG. 2 shows interfaces between network nodes shown in FIG. 1.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |

TABLE 1-continued

| REFERENCE POINT | DESCRIPTION |
|---|---|
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 3 is an exemplary diagram showing the architecture of a common E-UTRAN and a common EPC.

As shown in FIG. 3, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 4a is an exemplary diagram showing the structure of a radio interface protocol in a control plane between UE and an eNodeB, and FIG. 4b is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 4a and the radio protocol in the user plane of FIG. 4b are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 6 illustrates connection between an EPC and an IP Multimedia Subsystem (IMS).

The IMS is a network technique that enables not only a wired terminal but also a wireless terminal to perform IP-based packet switching (PS) and is proposed to connect both wired/wireless terminals through the IP (All-IP).

An IMS-based network includes control signaling, registration, and a Call Session Control Function (CSCF) for processing a session procedure. The CSCF may include a Proxy-CSCF (P-CSCF), a Serving-CSCF (S-CSCF), and an Interrogating-CSCF (I-CSCF). The P-CSCF operates as a first access point for a UE in the IMS-based network. The S-CSCF processes a session in the IMS network. That is, the S-SCSF is an entity serving to route a signal and routes a session in the IMS network. The I-CSCF operates as an access point to another entity in the IMS network.

Under the IMS, an IP-based session is controlled by a session initiation protocol (SIP). The SIP is a protocol for controlling a session, which is a signaling protocol that specifies a procedure in which terminals to communicate identify each other to detect locations thereof and generate a multimedia service session therebetween or delete or change a generated session. The SIP uses an SIP Uniform Resource Identifier (URI), similar to an email address, to distinguish each user, thus providing a service without being subjected to an IP address.

Referring to FIG. 6, a first P-GW 53a of the EPC is connected to the P-CSCF 61 of the IMS, and the P-CSCF 61 is connected to the S-CSCF 62.

Further, a second P-GW 53b of the EPC is connected to a network of an Internet service provider.

When a network failure occurs to disconnect the first P-GW 53a from the P-CSCF 61, all IMS-based services are stopped. Here, the IMS-based services include a very important service, for example, a Voice over LTE (VoLTE). When the VoLTE service is stopped, a user suffers serious inconvenience.

SUMMARY OF THE INVENTION

Accordingly, an object of the present invention is to present a method that can solve the aforementioned problem.

To achieve the foregoing object, one embodiment of the present specification provides a method for managing subscriber information to respond to a network failure by a Home Subscriber Server (HSS). The method may include: receiving a Packet Data Network (PDN) failure indication; updating subscriber information related to a PDN on the basis of the PDN failure indication; and transmitting a message indicating that the subscriber information is updated.

The PDN failure indication may be received by User Equipment (UE), Mobility Management Entity (MME), PDN, or Evolved Packet System (EPS) bearer.

The updating of the subscriber information may include configuring the subscriber information related to the PDN having a failure such that a specific type of the PDN having the failure is not allowed.

The updating of the subscriber information may include configuring the subscriber information related to the PDN having the failure such that Internet Protocol (IP) version 6 is not allowed and only IP version 4 is allowed when the specific type of the PDN having the failure is IP version 6.

The updating of the subscriber information may be performed by UE, MME, PDN, or EPS bearer.

The transmitting of the message indicating that the subscriber information is updated may include transmitting the message indicating that the subscriber information is updated to an MME during an attach procedure.

The transmitting of the message indicating that the subscriber information is updated may include separately transmitting the message indicating that the subscriber information is updated to an MME upon a request from the MME during a non-attach procedure.

The transmitting of the message indicating that the subscriber information is updated may include transmitting the message indicating that the subscriber information is updated to an MME without request from another network node.

The method may further include: receiving a failure restoration indication of the PDN; re-updating the subscriber information related to the PDN based on the failure restoration indication; and transmitting a message indicating that the subscriber information is re-updated.

To achieve the foregoing object, one embodiment of the present specification provides an HSS updating subscriber information to respond to a network failure. The HSS may include: a receiver to receive a PDN failure indication; a controller to update subscriber information related to a PDN on the basis of the PDN failure indication; and a transmitter to transmit a message indicating that the subscriber information is updated according to control by the controller.

The PDN failure indication is received by UE, MME, PDN, or EPS bearer.

The controller may configure the subscriber information related to the PDN having a failure such that a specific type of the PDN having the failure is not allowed in order to update the subscriber information.

The controller may update the subscriber information by UE, MME, PDN, or EPS bearer.

The controller may transmit the message indicating that the subscriber information is updated to an MME during an attach procedure.

When the receiver receives a failure restoration indication of the PDN, the controller may re-update the subscriber information related to the PDN based on the failure restoration indication and may transmit a message indicating that the subscriber information is re-updated through the transmitter.

According to the embodiments of the present invention, the problems in the related art can be solved.

DESCRIPTION OF EXEMPLARY EMBODIMENTS

Figure 1:
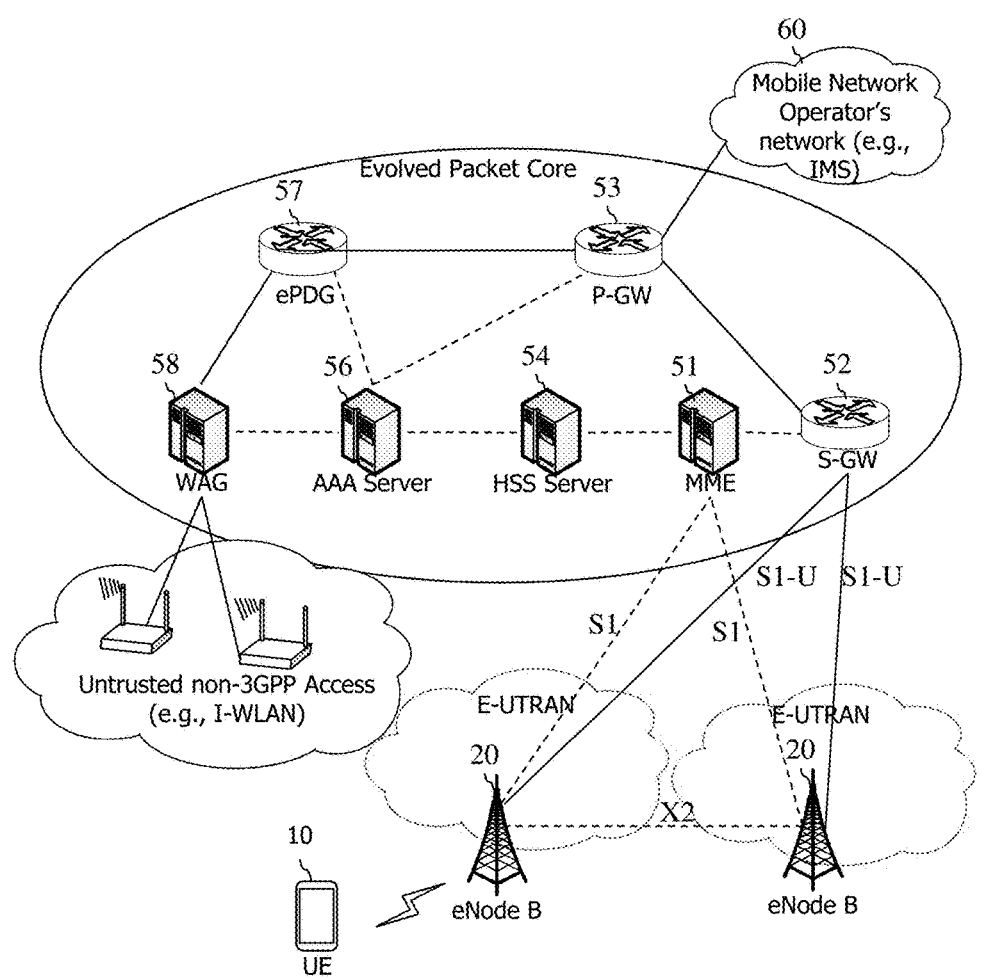
FIG. 1 shows the configuration of an evolved mobile communication network.
Figure 2:
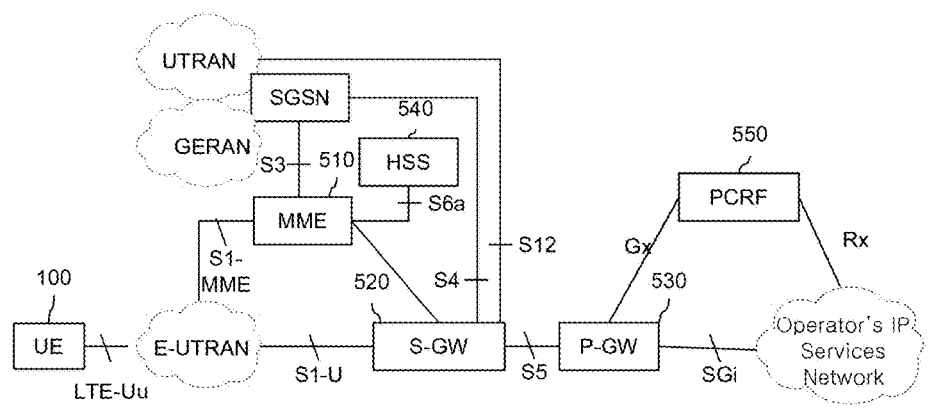
FIG. 2 shows interfaces between network nodes shown in FIG. 1
Figure 3:
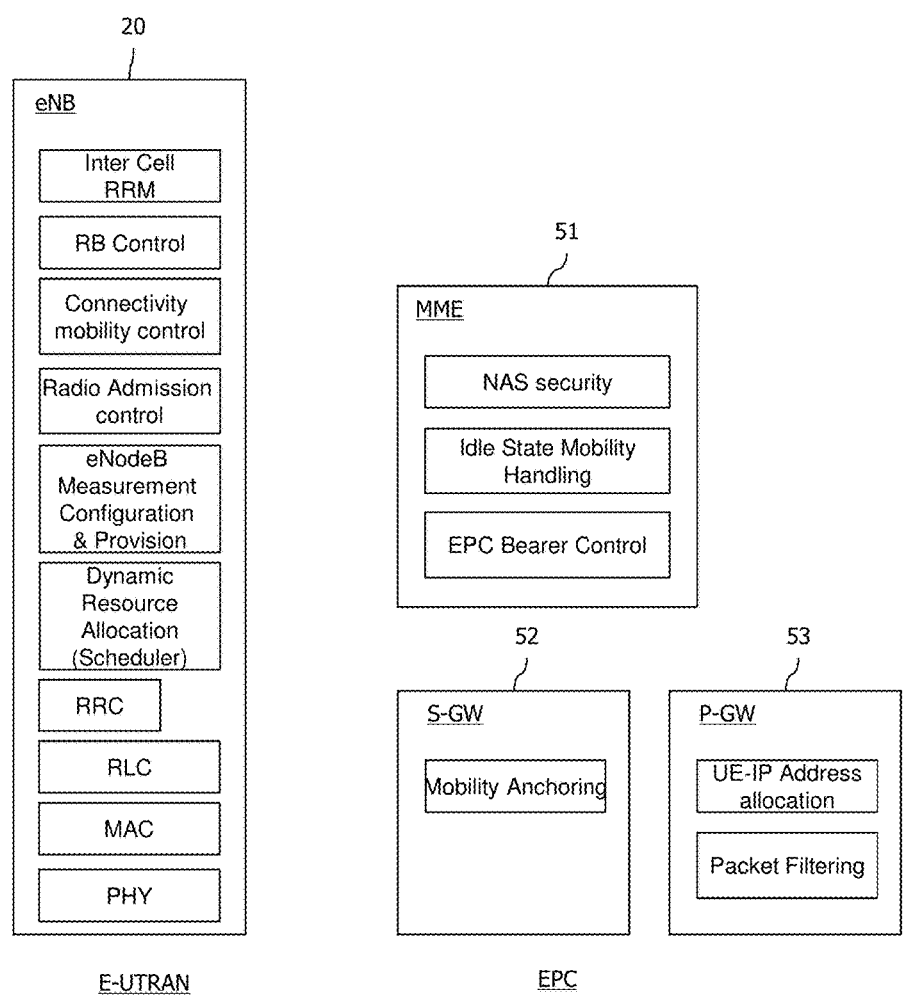
FIG. 3 is an exemplary diagram showing the architecture of a common E-UTRAN and a common EPC.
Figure 4A:
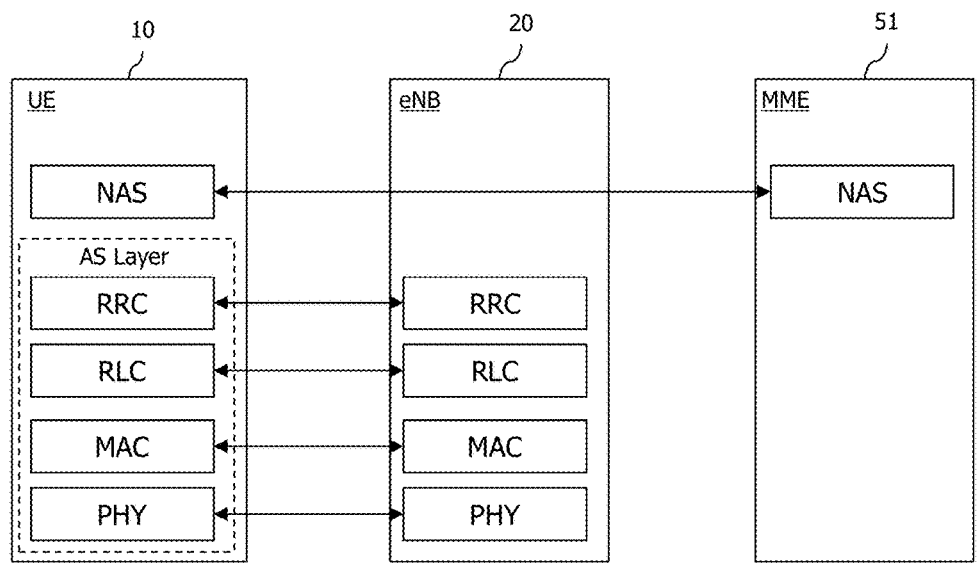
FIG. 4a is an exemplary diagram showing the structure of a radio interface protocol in a control plane between UE and an eNodeB.
Figure 4B:
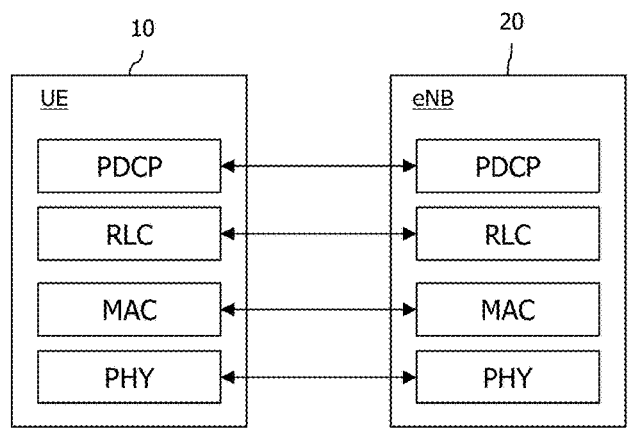
FIG. 4b is another exemplary diagram showing the structure of a radio interface protocol in a control plane between UE and an eNodeB.
Figure 5A:
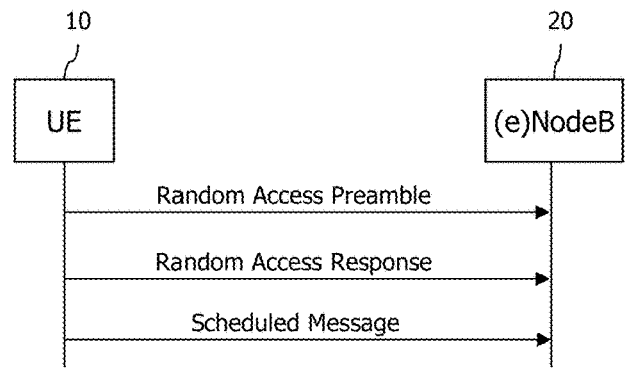
FIG. 5a is a flowchart illustrating a random access process in 3GPP LTE.
Figure 5B:
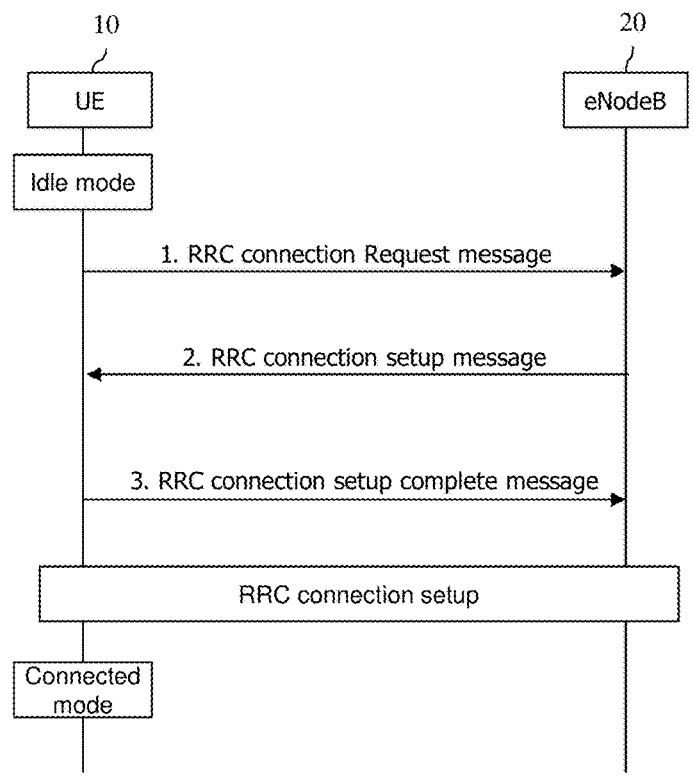
FIG. 5b illustrates a connection process in a radio resource control (RRC) layer.
Figure 6:
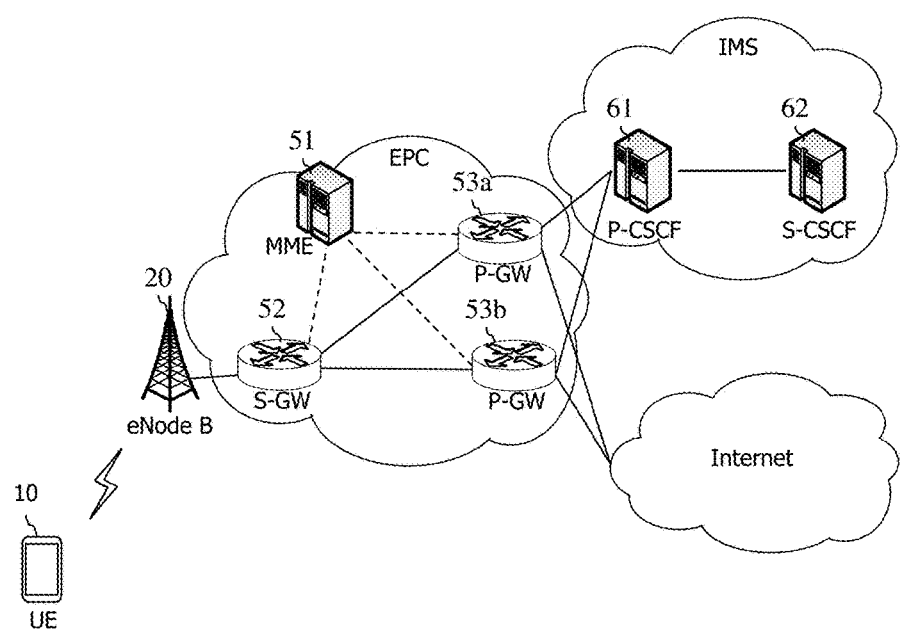
FIG. 6 illustrates connection between an EPC and an IP Multimedia Subsystem (IMS).

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

ANDSF (Access Network Discovery and Selection Function): As one network entity, a policy is provided to discover and select access which the terminal can use by the unit of the provider Meanwhile, a description is made hereinafter with reference to drawings.

Figure 7:
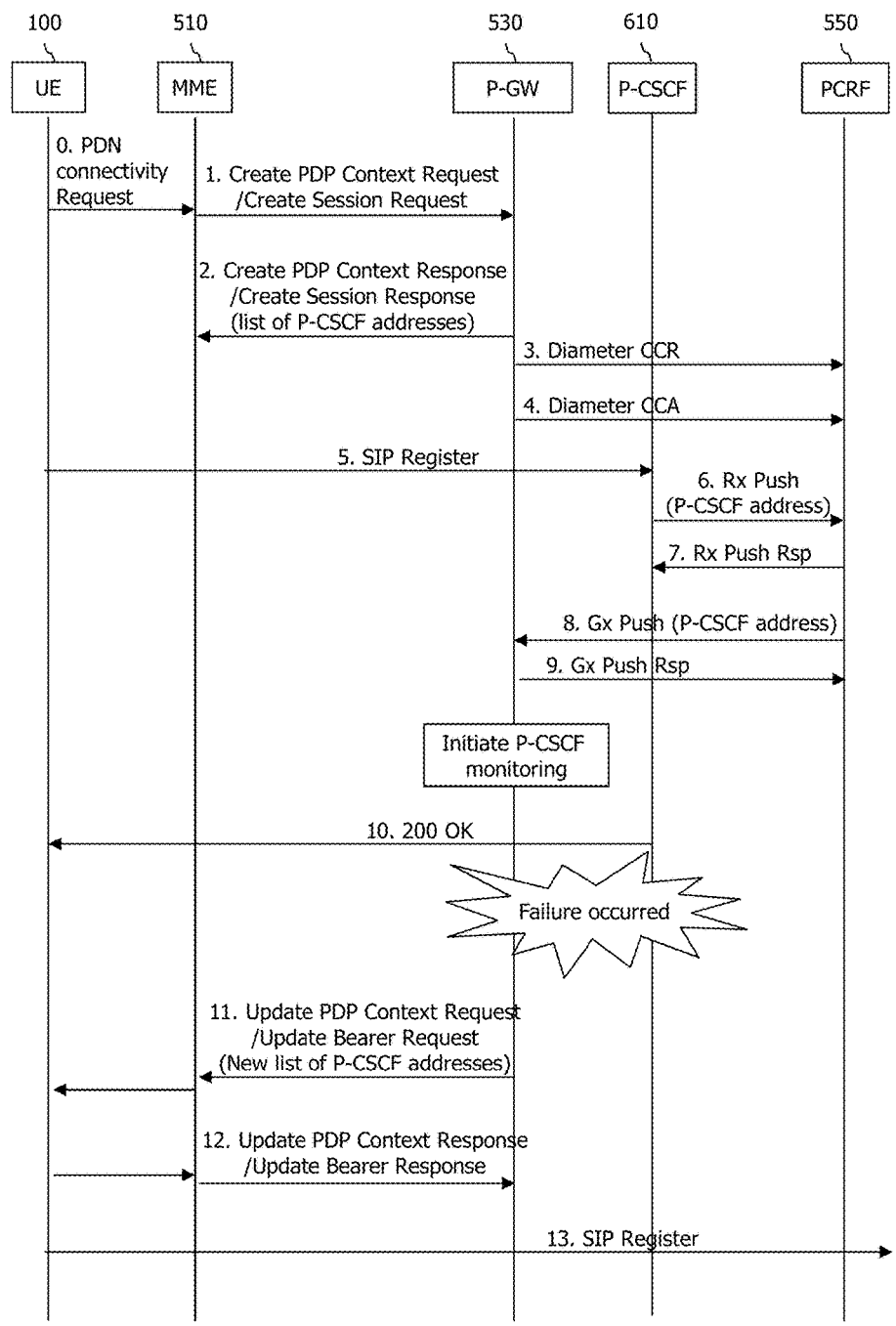
FIG. 7 illustrates an example of restoring a path, disconnected by a network failure, through a bypass.

FIG. 7 illustrates an example of restoring a path, disconnected by a network failure, through a bypass.

0) First, a UE 100 initiates an Internet Protocol-Connectivity Access Network (IP-CAN) session. To this end, the UE 100 may transmit a PDN Connectivity Request message.

1) An MME 510 performs a P-CSCF discovery procedure. The P-CSCF discovery procedure is for requesting a list of P-CSCF addresses. To this end, for example, the MME 510 may transmit a Create Session Request message or Create PDP Context Request message to a P-GW 530 or SGSN via an S-GW.

2) The P-GW 530 receives a result of the P-CSCF discovery procedure. That is, the P-GW 530 receives a list of P-CSCF addresses. The list of P-CSCF addresses may be received through a Create Session Response message or Create PDP Context Response message.

3) The P-GW 530 transmits a Diameter Credit Control Request (CCR) to a PCRF 550 in order to request Policy and Charging Control (PCC) rules.

4) The PCRF 550 transmits a Diameter Credit Control Answer (CCA) including PCC rules to the P-GW 530.

5) The UE 100 transmits a registration request message, for example, an SIP Register message, to a P-CSCF 610 based on the received list of P-CSCF addresses.

6) The P-CSCF 610 transmits, to the PCRF 550, an Rx Push message including an address thereof in order to report that the P-CSCF 610 is selected by the UE.

7) The PCRF 550 transmits an Rx Push Response message in response.

8) The PCRF 550 transmits a Gx Push message to the P-GW 530 in order to report the address of the P-CSCF 610.

9) The P-GW 530 transmits a Gx Push Response message in response.

In addition, the P-GW 530 stores the address of the P-CSCF 610 for the UE. The P-GW 530 monitors the state of the P-CSCF 610.

10) The P-CSCF 610 transmits a response message to the registration message, for example, a 200 OK message, to the UE 100.

11) Meanwhile, when the P-GW 530 detects that there is a problem or failure in connection to the P-CSCF 610 as a result of monitoring the state of the P-CSCF 610, the P-GW 530 transmits a new list excluding the address of the P-CSCF 610 having a failure (that is, a new list including addresses of other P-CSCFs) to all UEs that have established connection to the P-CSCF 610 having a failure. To this end, the P-GW 530 transmits an Update PDP Context Request message or Update Bearer Request message to the MME 510.

12) When the UE 100 transmits a response to the reception of the new list, the MME 510 transmits an Update PDP Context Response message or Update Bearer Response message to the P-GW 530.

13) Meanwhile, the UE 100 discovers a new P-CSCF through the new list and transmits a registration request message to the new P-CSCF.

As described above, when the P-GW 530 detects that there is a failure in connection to the P-CSCF 610, the P-GW 530 transmits a new list excluding the address of the P-CSCF 610 having a failure to the UE, thereby quickly restoring a failure.

However, although the P-GW 530 sends a new list, a failure may not quickly be restored depending on a situation.

For example, in addition to a physical failure, when a routing table of P-CSCF addresses in the entire corresponding PDN is damaged, other P-CSCF addresses that the P-GW 530 already has may also be useless. Thus, a registration request message, which the UE 100 transmits to another P-CSCF on a new list provided from the P-GW 530, may not arrive at the other P-CSCF.

For another example, when a failure occurs in the entire PDN, there is no available P-CSCF on the currently connected PDN.

As a result, even the method illustrated in FIG. 7 may not enable critical services including a VoLTE service, and thus a user has serious inconvenience in receiving services.

Moreover, when the UE 100 continuously reattempts transmission/reception services, signaling increases in a network to cause unnecessary consumption of resources and a very long delay time may be involved from time an initial service is attempted even to succeed in receiving a service.

<Embodiments of the Present Specification>

Therefore, embodiments of the present specification provide a method for quickly recognizing a network failure and actively resuming a service. An effective control method proposed in the present specification may be formed of one or more of the following operations.

I. P-GW Detecting and Evaluating Failure in Specific PDN

The P-GW 530 identifies whether the same service is provided via a different PDN. For example, when a failure occurs in an IPv4 PDN, the P-GW 530 identifies whether the same service is provided via an IPv6 PDN. When it is possible to connect to the different PDN in order to provide the service, the P-GW 530 recognizes that a corresponding IP version of an IP address needs to be allocated to the UE.

The P-GW 530 identifies whether the PDN of the UE is a PDN that provides a specific service (for example, a PDN that provides a VoLTE-related service). Such identification may be performed based on configuration information, information received from the PCRF, or P-CSCF information managed for connection setup.

II. P-GW Actively Notifying Another Network Node of Network Failure/Inducing Change of Connection Configuration of UE The P-GW 530 identifies the availability of a network node belonging to a PDN having no failure and updates a list of P-CSCF addresses regardless of preference of a service provider for a PDN type (before the service provider recognizes a network failure and changes a configuration), thereby preparing for transmission to the UE.

Further, the P-GW 530 may notify the UE or network node through various routes that there is a need to change the connection configuration of the UE, which may be achieved by one of various operations illustrated below.

1) The P-GW 530 may notify the MME via the S-GW that there is a need to change the connection configuration of the UE, which may be achieved by using a general GTP protocol or by adding a new field to the general GTP protocol. Particularly, in a case of an IPv4 failure, the P-GW 530 may implicitly/explicitly report that there is a need to establish an IPv6 connection (and vice versa).

For another example, the P-GW 530 may store relevant information on a need to change the connection configuration of the UE in the MME.

In a reattach procedure or PDN reconnection, not only subscriber information and requests transmitted from the UE but also information for determining a PDN type based on information on a failure situation may be transmitted to the P-GW (for example, using a Create Session Request message). Here, the reattach procedure refers to an attach procedure performed following a detach procedure. The PDN reconnection refers to a PDN connection request procedure performed again following a PDN disconnection.

2) More actively, when a detach or PDN disconnection-related message is transmitted to the UE, the P-GW 530 may implicitly/explicitly transmit information indicating that connection to another PDN is needed to the UE.

3) The relevant information may be stored in the UE.

The UE may request a session from a PDN having no failure through a reattach/PDN reconnection request message.

4) The P-GW 530 may notify a Home Subscriber Server (HSS) via the S-GW/MME that there is a need to change the connection configuration of the UE.

The HSS may temporarily change and adjust the subscriber information such that a PDN type having a failure is not allowed to be included in a PDN type allowed for connection.

5) The P-GW 530 may implicitly/explicitly transmit information on a PDN having a failure to a third network node that can obtain an address of a network node needed for connection to a specific PDN, such as a P-CSCF including a DHCP server. Specifically, when the UE or network node sends a request message to acquire an address of a network node needed for connection to a specific PDN, the P-GW 530 may store the relevant information to send a network address for connection to a PDN having no failure and may manage a list of available networks.

6) The P-GW may temporarily adjust the configuration.

In addition to notification to another network node, the P-GW 530 changes the configuration of the P-GW (the P-GW dynamically changes the configuration via determination, instead of the service provider updating the configuration), adjusts the configuration such that a PDN type having a failure is not allowed, and performs an operation needed for detach/PDN disconnection.

Hereinafter, an operation according to an embodiment of the present invention is described in detail with reference to drawings. The following operation relates to an active failure control mechanism performed to hand over a service to a network having no failure when a specific PDN type failure occurs. This operation may allow a user to be provided with a continued service as quickly as possible when a failure occurs.

Further, a network node (for example, P-GW) detecting a failure directly attempts to immediately resume a service for UEs connected to the network node in order to reduce time to resume a service.

Figure 8:
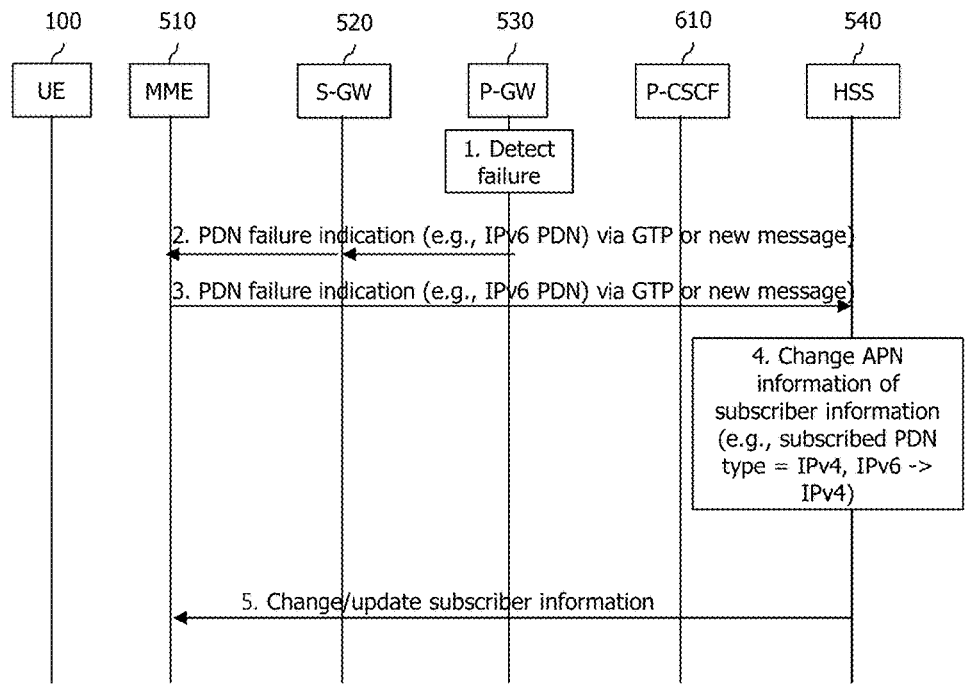
FIG. 8 is a flowchart illustrating an improved operation of a Home Subscriber Server (HSS) according to one embodiment of the present specification.

FIG. 8 is a flowchart illustrating an improved operation of the HSS according to one embodiment of the present specification.

1) A network node (for example, a P-GW, S-GW, MME, DNS server, HSS, PCRF, ePDG, TWAN, AAA server, and the like) detects a failure in a specific PDN.

A failure may be detected by a combination of one or more of the following methods.

a. A service provider directly transmits a service provider command or updates a configuration so that all or some network nodes (for example, a P-GW, S-GW, MME, DNS server, HSS, PCRF, ePDG, TWAN, AAA server, and the like) may recognize the failure in the specific PDN.

b. In a case where a DNS query is attempted to discover a network node (for example, a P-CSCF) of the specific PDN, when the number of attempt failures, which is calculated for a certain period of time, is greater than a specific threshold, the entire PDN is considered to have a failure.

c. In a case where data/signal is transmitted to a network node (for example, a P-CSCF) of the specific PDN, when no acknowledgement is received for a certain period of time or when the number of received responses to transmission failure is greater than a specific threshold, the entire PDN is considered to have a failure.

d. When time to discover an address of a network node of the specific PDN or delay time in data/signal transmission between network nodes relatively increases to be greater than a specific threshold, the entire PDN is considered to have a failure.

e. When time to discover an address of a network node of the specific PDN or delay time in data/signal transmission between network nodes relatively increases and the number of times this situation continuously occurs is greater than a specific threshold, the entire PDN is considered to have a failure.

The failure in the PDN may refer to a physical failure that occurs in all network nodes or some network nodes belonging to the PDN to disable the operations of the network nodes and may also refer to a state in which an address of a network node belonging to the PDN is not detected so that data/signal may not be transmitted. Further, although the address of the network node is detected or data/signal may be transmitted, time to detect the address of the network node/transmission delay time or success rate is not included in a normal service providing range or when network node address discovery/transmission failure rate exceeds a normal service providing range, the PDN may be considered to have a failure. The thresholds may be preset by the service provider or be individually or collectively updated.

2~3) Information on the detected failure may be transmitted to another network (for example, a P-GW, S-GW, MME, DNS server, HSS, PCRF, ePDG, TWAN, AAA server, and the like).

For example, information on a failure in a specific PDN detected by the P-GW 530 may be transmitted to the MME 510 via the S-GW 520, and the MME 510 may forward this information to the HSS 540 via processing or as it is. A basic GTP protocol message or newly defined message may be used to transmit this information.

An information transmission unit may be a UE, a PDN, and an EPS bearer, or information may be transmitted by network node (for example, an MME).

For example, subscriber information may be transmitted by MME between the MME and the HSS to signal the failure in the specific PDN to the HSS. However, if subscriber information is transmitted by UE, the failure in the specific PDN may be signaled to the HSS only with respect to a UE connected to the PDN currently having a failure.

For example, the information on the failure in the specific PDN, which is transmitted from the P-GW 530 to the MME 510 via the S-GW 520, may be transmitted by PDN using a GPRS Tunneling Protocol (GTP) tunnel or be transmitted only once by MME to each MME using a new message or a control signaling message between network nodes.

4) After recognizing the failure in the specific PDN, the HSS 540 updates subscriber information including the information on the PDN. That is, the HSS 540 adjusts the subscriber information such that a PDN type having a failure is not allowed as a PDN type allowed for connection. That is, the subscriber information has no permission for the PDN type, thus preventing an attempt to connect to the PDN.

For example, when a failure occurs in an IPv6 PDN, the HSS 540 changes specific subscriber information, from indicating that IPv6 and IPv4 PDNs are allowed to indicating only the IPv4 PDN is allowed.

5) After updating the subscriber information, the HSS 540 transmits a message to the MME 510 to report the change of the subscriber information.

Alternatively, when the MME 510 performs a process of acquiring subscriber information, the updated subscriber information is transmitted to the MME 510. For example, when an attach procedure is in progress, the MME 510 performs a process of acquiring the subscriber information from the HSS 540, in which the changed subscriber information may be transmitted to the MME 510.

A process has been described in which when a network node detects a failure in a specific PDN and notifies an HSS of the failure, the HSS updates subscriber information and transmits the updated subscriber information to an MME. However, when it is detected that the failure in the specific PDN is restored after a certain period of time, a failure restoration indication is transmitted to the HSS and the HSS updates the subscriber information and transmits the updated subscriber information to the MME.

Failure restoration may be detected by a combination of one or more of the following methods.

a. A service provider directly transmits a service provider command or updates a configuration so that all or some network nodes (for example, a P-GW, S-GW, MME, DNS server, HSS, PCRF, ePDG, TWAN, AAA server, and the like) may recognize the restoration of the failure in the specific PDN.

b. In a case where although not for a service (because an attempt at a service is not currently made to the PDN having the failure), a DNS query is periodically transmitted to discover a network node (for example, a P-CSCF) of the specific PDN internally in the network, when the number of successes, which is calculated for a certain period of time, is greater than a specific threshold, it is considered that the entire PDN is restored from the failure.

c. In a case where, which although not for a service (because an attempt at a service is not currently made to the PDN having the failure), a polling signal is transmitted to a network node (for example, a P-CSCF) of the specific PDN internally in the network and an acknowledgement is normally received for a certain period of time, when the number of received responses to success, which is calculated for a certain period of time, is greater than a specific threshold, it is considered that the entire PDN is restored from the failure.

d. Although not for a service (because an attempt at a service is not currently made to the PDN having the failure), when time to discover an address of a network node of the specific PDN or delay time in polling signal transmission between network nodes internally in the network is within a specific threshold range, it is considered that the entire PDN is restored from the failure.

e. Although not for a service (because an attempt at a service is not currently made to the PDN having the failure), when time to discover an address of a network node of the specific PDN or delay time in polling signal transmission between network nodes internally in the network is within a specific threshold range and the number of times this situation continuously occurs is greater than a specific threshold, it is considered that the entire PDN is restored from the failure.

Figure 9:
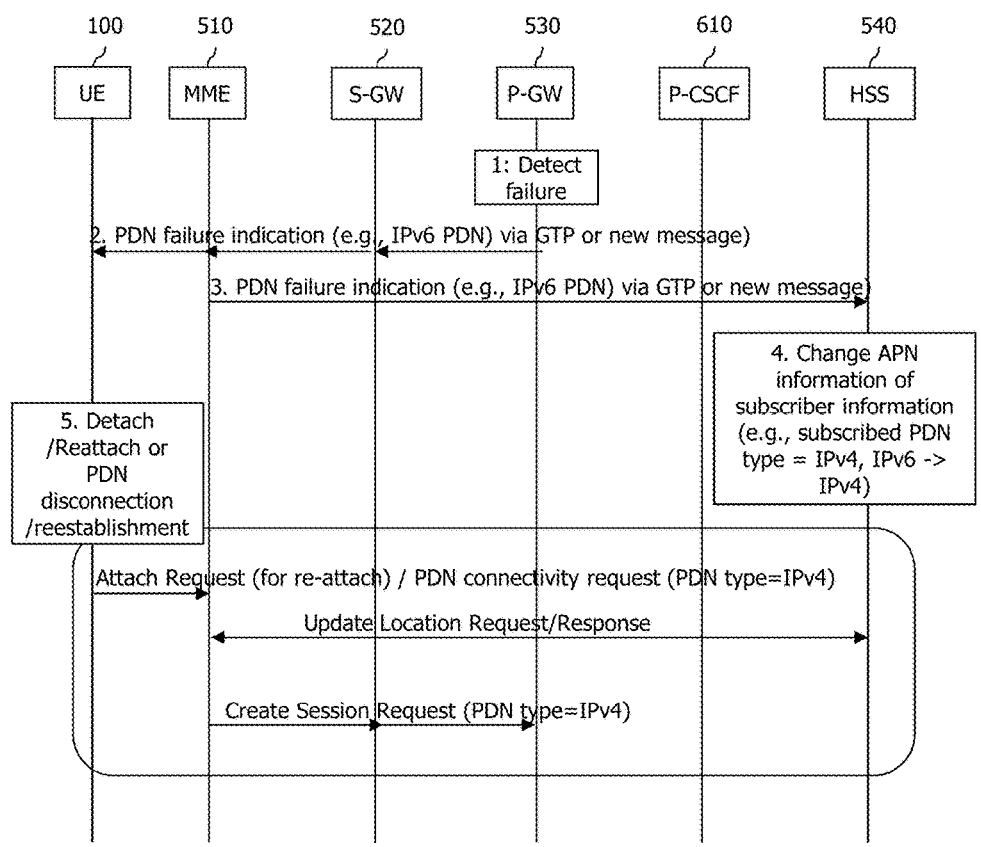
FIG. 9 is a flowchart illustrating an improved operation of a UE according to one embodiment of the present specification.

FIG. 9 is a flowchart illustrating an improved operation of the UE according to one embodiment of the present specification.

1) A network node (for example, a P-GW, S-GW, MME, DNS server, HSS, PCRF, ePDG, TWAN, AAA server, and the like) detects a failure in a specific PDN. A failure detecting method has been described above.

2~3) Information on the failure in the specific PDN detected in the network is implicitly/explicitly transmitted to the UE 100 and the HSS 540. The information on the failure is transmitted as described above.

4) After recognizing the failure in the specific PDN, the HSS 540 updates subscriber information including the information on the PDN.

5) The UE 100, which has implicitly/explicitly received the information on the failure in the specific PDN, determines whether the specific PDN is in a failure state. If the specific PDN is in the failure state, the UE 100 is disconnected from the PDN having the failure and establishes connection to a PDN enabling a normal service. That is, the UE 100 performs a detach operation and then a reattach operation or performs PDN disconnection and then a reestablishment procedure.

Specifically, when the UE 100 explicitly receives the information on the failure in the PDN, that is, a PDN failure indication, and determines that the specific PDN is in the failure state based on the reception, the UE 100 may explicitly determine a PDN type providing a normal service and may transmit a connection request message to the network in a reattach/PDN reestablishment process.

Alternatively, when the UE 100 implicitly receives the information on the failure in the specific PDN and determines that the specific PDN is in the failure state based on the reception, the UE 100 transmits an attach request message/PDN connection request message to perform an attach/PDN establishment process. Here, a network receiving the request message, that is, the MME, may establish connection to a PDN type providing a normal service based on subscriber information or the information on the failure in the specific PDN stored in the MME. For example, according to a conventional technique, when the MME already has context of a UE, the MME may not perform a process for location registration in the HSS/subscriber information acquiring. However, when the MME recognizes a failure in a specific PDN, the MME performs a process of acquiring subscriber information from the HSS although having the context of the UE. Accordingly, the MME performs a subsequent procedure for connection to a PDN having no failure based on the subscriber information updated by HSS.

The foregoing embodiment illustrates a process after a UE acquires information on a failure in a specific PDN. If the failure in the specific PDN is restored after a certain period of time, a similar process for acquiring information on the restoration of the failure and establishing connection to a new PDN may be performed.

Figure 10:
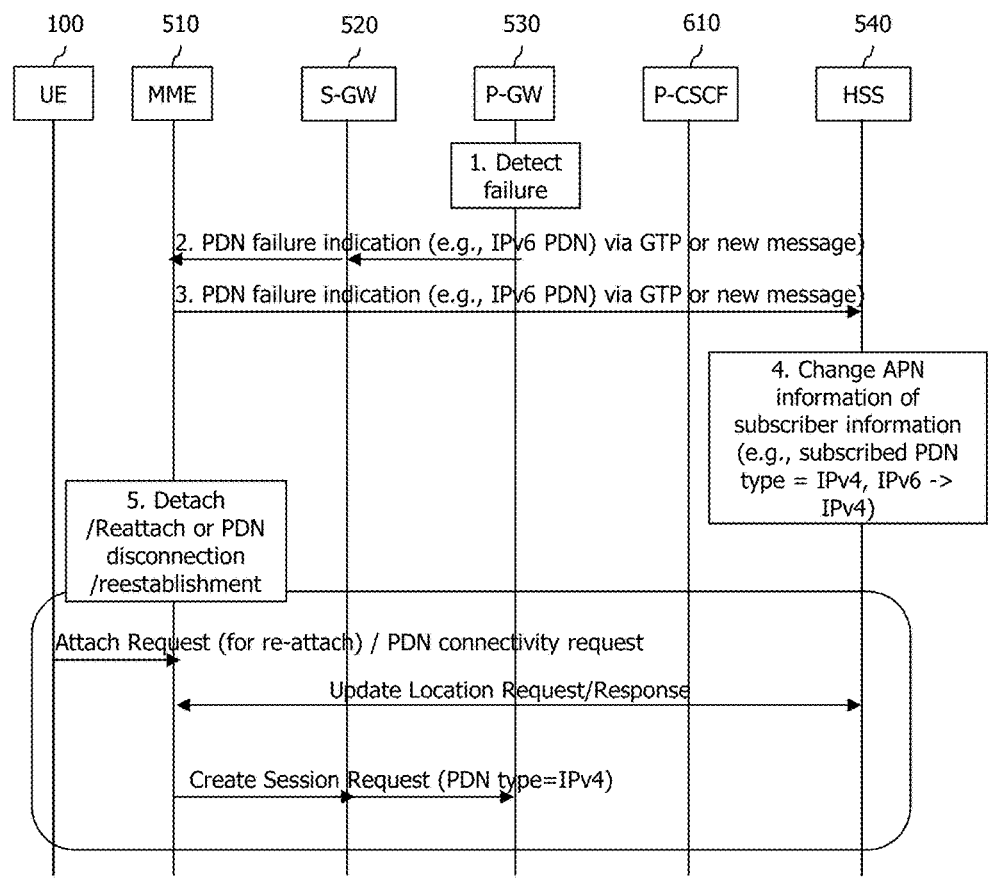
FIG. 10 is a flowchart illustrating an improved operation of an MME according to one embodiment of the present specification.

FIG. 10 is a flowchart illustrating an improved operation of the MME according to one embodiment of the present specification.

1) A network node (for example, a P-GW, S-GW, MME, DNS server, HSS, PCRF, ePDG, TWAN, AAA server, and the like) detects a failure in a specific PDN. A failure detecting method has been described above.

2) Information on the failure in the specific PDN detected in the network is implicitly/explicitly transmitted to the MME 510. The information on the failure is transmitted as described above.

3) The MME 510 implicitly/explicitly transmits the information on the failure in the specific PDN to the HSS 540. The information on the failure is transmitted as described above.

4) After recognizing the failure in the specific PDN, the HSS 540 updates subscriber information including the information on the PDN.

5) The MME 510, which has implicitly/explicitly received the information on the failure in the specific PDN, determines whether the specific PDN is in a failure state. If the specific PDN is in the failure state, the MME 510 is disconnected from the PDN having the failure and establishes connection to a PDN enabling a normal service. That is, the MME 510 performs a detach operation and then a reattach operation or performs PDN disconnection and then a reestablishment procedure.

Specifically, the MME 510 operates as follows.

a. The MME 510 may receive a request message for setup of connection to a PDN type providing a normal service from the UE 100.

b. The MME 510 may receive, from the HSS 540, subscriber information indicating that only a PDN type providing a normal service is allowed.

c. The MME 510 acquires and stores/configures information on a failure in a specific PDN type from another network node to select a PDN type providing a normal service. This information is transmitted to the P-GW 530.

d. After acquiring the information on the failure in the specific PDN type from the other network node, the MME 510 may transmit, to the UE, an indication for detaching/attaching the UE 100 or PDN disconnection/reestablishment. Here, the information on the PDN having the failure may also be explicitly/implicitly transmitted.

e. After acquiring the information on the failure in the specific PDN type from the other network node, the MME 510 acquires subscribe information from the HSS in order to respond to the connection setup request from the UE, although already having UE context.

A process after the MME 510 acquires information on a failure in a specific PDN has been described. If the failure in the specific PDN is restored after a certain period of time, a similar process for acquiring information on the restoration of the failure and establishing connection to a new PDN may be performed.

Figure 11:
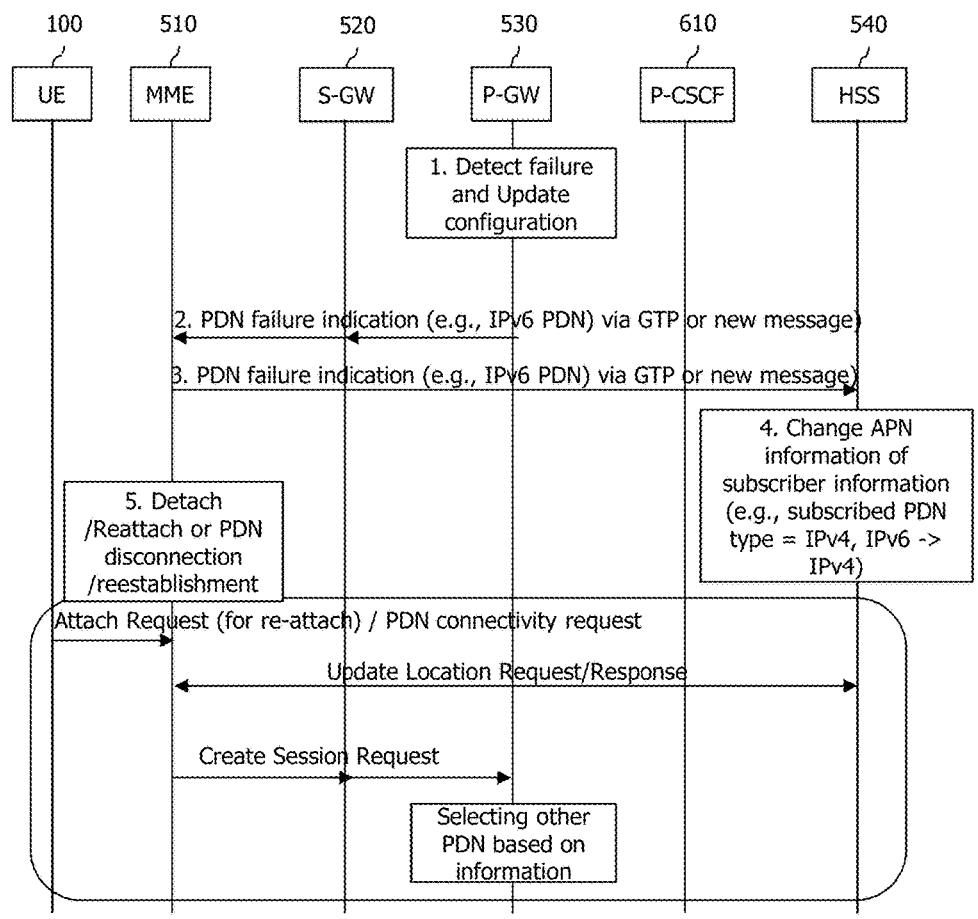
FIG. 11 is a flowchart illustrating an improved operation of a P-GW according to one embodiment of the present specification.

FIG. 11 is a flowchart illustrating an improved operation of the P-GW according to one embodiment of the present specification.

1) A network node (for example, a P-GW, S-GW, MME, DNS server, HSS, PCRF, ePDG, TWAN, AAA server, and the like) detects a failure in a specific PDN. A failure detecting method has been described above.

2) Information on the failure in the specific PDN detected in the network is implicitly/explicitly transmitted to the MME 510. The information on the failure is transmitted as described above.

3) The MME 510 implicitly/explicitly transmits the information on the failure in the specific PDN to the HSS 540. The information on the failure is transmitted as described above.

4) After recognizing the failure in the specific PDN, the HSS 540 updates subscriber information including the information on the PDN.

5) The MME 510, which has implicitly/explicitly received the information on the failure in the specific PDN, disconnects the UE 100 from the PDN having the failure and establishes connection of the UE 100 to a PDN providing a normal service. That is, the MME 510 performs a detach operation and then a reattach operation or performs PDN disconnection and then a reestablishment procedure.

Here, when the P-GW 530 receives a request message (for example, a connection setup request message) during the reattach or PDN reestablishment process, a PDN type providing a normal service is selected based on the foregoing stored/configured information.

Additionally, in operation 2), since pieces of information on PDNs having a failure are implicitly/explicitly transmitted/stored in a third network node that can obtain an address of a network node needed for connection to a specific PDN, such as a P-CSCF, when a request message is transmitted to acquire an address of a network node needed for connection to a specific PDN, the P-GW 530 may store the relevant information to send a network address for connection to a PDN having no failure and may manage a list of available networks.

A process after the P-GW or another network node acquires information on a failure in a specific PDN has been described. If the failure in the specific PDN is restored after a certain period of time, a similar process for acquiring information on the restoration of the failure and establishing connection to a new PDN may be performed.

The aforementioned details may be implemented in hardware, which is described with reference to FIG. 17.

Figure 12:
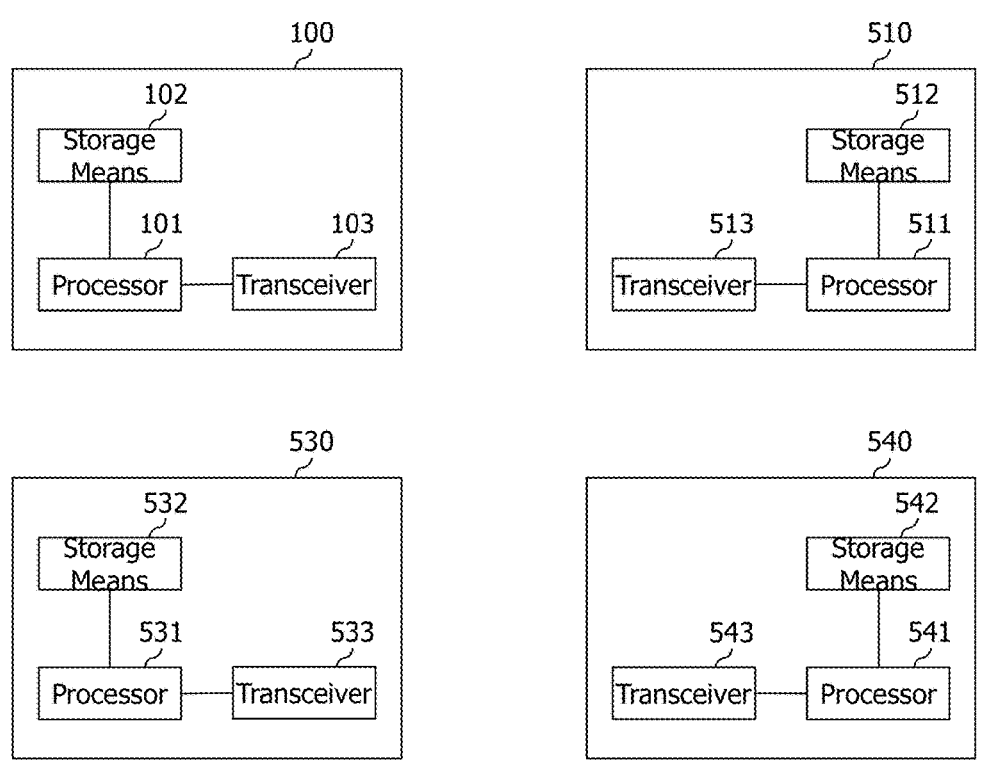
FIG. 12 is a block diagram illustrating a configuration of a UE 100, an MME 510, a P-GW 530, and an HSS 540 according to one embodiment of the present invention.

FIG. 12 is a block diagram illustrating a configuration of the UE 100, the MME 510, the P-GW 530, and the HSS 540 according to one embodiment of the present invention.

As illustrated in FIG. 12, the UE 100 includes a storage means 101, a controller 102, and a transceiver 103. The MME 510 includes a storage means 511, a controller 512, and a transceiver 513. The P-GW 530 includes a storage means 531, a controller 532, and a transceiver 533. The HSS 540 includes a storage means 541, a controller 542, and a transceiver 543.

The storage means 101, 511, 531, and 541 store the foregoing methods.

The controllers 102, 512, 532, and 542 control the storage means 101, 511, 531, and 541 and the transceivers 103, 513, 533, and 543. Specifically, the controllers 102, 512, 532, and 542 perform the foregoing methods stored in the storage means 101, 511, 531, and 541. The controllers 102, 512, 532, and 542 transmit the foregoing signals through the transceivers 103, 513, 533, and 543.

Although exemplary embodiments of the present invention have been illustrated above, the scope of the present invention is not limited by these specific embodiments. Therefore, the present invention may be changed, modified, or adapted variously without departing from the idea of the present invention and the appended claims.

What is claimed is:

1. A method for managing subscriber information to respond to a network failure, the method performed by a Home Subscriber Server (HSS) and comprising:
   receiving a Packet Data Network (PDN) failure indication;
   updating the subscriber information related to a PDN based on the PDN failure indication, by configuring the subscriber information such that a specific type of the PDN having the failure is not allowed;
   transmitting, to a Mobility Management Entity (MME), a first message, wherein the first message indicates that the subscriber information is updated,
   wherein a subsequent procedure is performed by the MME based on the updated subscriber information,
   wherein the subsequent procedure relates to establishing a connection to the PDN when there is no failure;
   receiving a failure restoration indication of the PDN;
   re-updating the subscriber information related to the PDN based on the failure restoration indication; and
   transmitting, to the MME, a second message, wherein the second message indicates that the subscriber information is re-updated.

2. The method of claim 1, wherein the PDN failure indication is received from the MME.

3. The method of claim 1, wherein the updating of the subscriber information further comprises:
   configuring the subscriber information related to the PDN having the failure such that Internet Protocol (IP) version 6 is not allowed and only IP version 4 is allowed, when the specific type of the PDN having the failure uses IP version 6.

4. The method of claim 1, wherein the transmitting of the message indicating that the subscriber information is updated further comprises:
   transmitting the message indicating that the subscriber information is updated to the MME during an attach procedure.

5. The method of claim 1, wherein the transmitting of the message indicating that the subscriber information is updated further comprises:
   transmitting the message indicating that the subscriber information is updated to the MME upon receiving a request from the MME during a non-attach procedure.

6. The method of claim 1, wherein the transmitting of the message indicating that the subscriber information is updated further comprises: transmitting the message indicating that the subscriber information is updated to the MME without receiving a request from another network node.

7. A Home Subscriber Server (HSS) updating subscriber information to respond to a network failure, the HSS comprising:
 a receiver;
 a transmitter; and
 a controller, operatively coupled to the receiver and the transmitter, wherein the controller is configured to:
 control the receiver to receive a Packet Data Network (PDN) failure indication;
 update the subscriber information related to a PDN based on the PDN failure indication, by configuring the subscriber information such that a specific type of the PDN having the failure is not allowed;
 control the transmitter to transmit a first message, wherein the first message indicates that the subscriber information is updated,
 wherein a subsequent procedure is performed by a Mobility Management Entity (MME) based on the updated subscriber information,
 wherein the subsequent procedure relates to establishing a connection to the PDN when there is no failure;
 control the receiver to receive a failure restoration indication of the PDN;
 re-update the subscriber information related to the PDN based on the failure restoration indication; and
 control the transmitter to transmit a second message, wherein the second message indicates that the subscriber information is re-updated.

8. The HSS of claim 7, wherein the PDN failure indication is received from the MME.

9. The HSS of claim 7, wherein the controller is further configured to control the transmitter to transmit the message indicating that the subscriber information is updated to the MME during an attach procedure.

* * * * *